US012240746B2

(12) United States Patent
Carone et al.

(10) Patent No.: US 12,240,746 B2
(45) Date of Patent: Mar. 4, 2025

(54) TOUCHLESS FLOWABLE PRODUCT DISPENSER

(71) Applicant: A. J. ANTUNES & CO., Carol Stream, IL (US)

(72) Inventors: Joe Carone, Darien, IL (US); Chad Elliott, Naperville, IL (US)

(73) Assignee: A. J. ANTUNES & CO., Carol Stream, IL (US)

( * ) Notice: Subject to any disclaimer, the term of this patent is extended or adjusted under 35 U.S.C. 154(b) by 146 days.

(21) Appl. No.: 18/212,968

(22) Filed: Jun. 22, 2023

(65) Prior Publication Data

US 2023/0391602 A1 Dec. 7, 2023

Related U.S. Application Data

(63) Continuation of application No. 17/368,264, filed on Jul. 6, 2021, now abandoned.

(60) Provisional application No. 63/048,599, filed on Jul. 6, 2020.

(51) Int. Cl.

| | |
|---|---|
| ***B67D 1/12*** | (2006.01) |
| ***A47G 19/18*** | (2006.01) |
| ***B67D 1/00*** | (2006.01) |
| ***B67D 1/08*** | (2006.01) |
| ***B67D 1/10*** | (2006.01) |

(52) U.S. Cl.

CPC ........... *B67D 1/124* (2013.01); *A47G 19/183* (2013.01); *B67D 1/0081* (2013.01); *B67D 1/0888* (2013.01); *B67D 1/108* (2013.01); *B67D 2001/009* (2013.01)

(58) Field of Classification Search

CPC .... B67D 1/124; B67D 1/0081; B67D 1/0888; B67D 1/108; B67D 2001/009; A47G 19/183

USPC .......................................................... 222/54

See application file for complete search history.

(56) References Cited

U.S. PATENT DOCUMENTS

| | | | | |
|---|---|---|---|---|
| 6,705,356 | B2 | 3/2004 | Barton et al. | |
| 7,690,403 | B2 | 4/2010 | You et al. | |
| 10,928,235 | B2 * | 2/2021 | Shea-Simonds | G01F 11/125 |
| 11,312,610 | B2 * | 4/2022 | Rudick | G06F 3/04883 |
| 2005/0138951 | A1 | 6/2005 | Hooker | |
| 2011/0278324 | A1 | 11/2011 | Kilian et al. | |
| 2012/0138629 | A1 * | 6/2012 | Ashrafzadeh | B67D 1/0858 222/1 |
| 2014/0263427 | A1 * | 9/2014 | Muderlak | B05B 11/1052 222/52 |

(Continued)

FOREIGN PATENT DOCUMENTS

| | | | | |
|---|---|---|---|---|
| EP | 1857405 | | 11/2021 | |
| WO | WO-2022010897 | A1 * | 1/2022 | A47G 19/183 |

*Primary Examiner* — Paul R Durand
*Assistant Examiner* — Michael J. Melaragno
(74) *Attorney, Agent, or Firm* — LAW OFFICES OF STEVEN W. WEINRIEB

(57) ABSTRACT

A new and improved touchless flowable product dispenser which is to be utilized to reduce the amount of bacteria and germs transmitted when a customer wishes to dispense a flowable product, such as, for example, various condiments into a container. This invention allows large quantities of the flowable product to be stored and dispensed without customer contact, thereby reducing the risk of germ and bacteria transmission inside of a restaurant, particularly during infectious disease events or calendar seasons.

22 Claims, 11 Drawing Sheets

(56) References Cited

U.S. PATENT DOCUMENTS

| | | | | |
|---|---|---|---|---|
| 2015/0102057 | A1* | 4/2015 | Gehl ...................... | B67D 7/302<br>222/113 |
| 2016/0368754 | A1 | 12/2016 | Rosenlund et al. | |
| 2018/0072557 | A1 | 3/2018 | Bertness et al. | |
| 2019/0300357 | A1* | 10/2019 | Crawford .............. | G07F 13/065 |
| 2020/0072657 | A1* | 3/2020 | Gauger ................... | A47J 47/01 |
| 2022/0048754 | A1* | 2/2022 | Schnacke ............. | B67D 1/1405 |

* cited by examiner

TOUCHLESS FLOWABLE PRODUCT DISPENSER

CROSS-REFERENCE TO RELATED PATENT APPLICATIONS

This patent application is a Continuation-in-Part (CIP) of U.S. patent application Ser. No. 17/368,264 which was filed on Jul. 6, 2021, and which, in turn, is a non-provisional conversion of U.S. Provisional Patent Application Ser. No. 63/048,599 which was filed on Jul. 6, 2020, all of the priority benefits of which are hereby claimed.

FIELD OF THE INVENTION

The present invention relates generally to food service equipment, and more particularly to a new and improved touchless flowable product dispenser which is to be utilized to reduce the amount of bacteria and germs transmitted when a customer wishes to dispense a flowable product, such as, for example, various condiments, such as, for example ketchup, mustard, mayonnaise, salsa, and the like, into a vessel, such as, for example, a souffle cup, where the dispensed flowable product can then, in turn, be used upon various food items, such as, for example, hamburgers, French fries, nachos, salads, and the like. Alternatively, the new and improved touchless flowable product dispenser can likewise be utilized to dispense beverages, such as, for example, tea, coffee, soft drinks, and the like, into the souffle cup. Still yet further, the new and improved touchless flowable product dispenser can likewise be utilized to dispense a flowable product, such as, for example, various condiments, such as, for example, ketchup, mustard, mayonnaise, salsa, soy sauce, and the like, directly onto a food item that would not be capable of being contained within a souffle cup. This invention would allow large quantities of the flowable product to be stored and dispensed without customer contact, thereby reducing the risk of germ and bacteria transmission inside of a restaurant, particularly during infectious disease events, occurrences, or calendar seasons.

BACKGROUND OF THE INVENTION

As the world experienced the coronavirus pandemic of 2019-2021, many businesses, including restaurants, were forced to temporarily close, or in the case of the restaurant business, to only offer take-out orders or the delivery of food by means of food courier services, as opposed to permitting any indoor dining. As the pandemic has now been, for the most part, contained and significantly mitigated as a result of the discovery and availability of coronavirus vaccines, businesses are re-opening, including restaurants for inside or indoor dining. However, the risk of the pandemic, and that of future pandemics, still exists, and so extraordinary precautions are being taken to ensure, or at least minimize to the greatest extent possible, the potential for any germs, bacteria, and viruses to be transmitted. One area in which germs, bacteria, and viruses can be easily spread in, for example, restaurants and fast-food establishments, are those areas which are commonly utilized by multiple customers or consumers. More particularly, one such area would be that area of the restaurant or fast-food establishment where customers go to apply condiments to their food items, or, alternatively, to receive a beverage, all of which may be dispensed into a souffle cup or the like, or directly onto a food item.

A need therefore exists in the art for a new and improved product dispenser. Another need exists in the art for a new and improved product dispenser which comprises a touchless flowable product dispenser. Still another need exists in the art for a new and improved product dispenser which comprises a touchless flowable product dispenser for dispensing food products. Yet another need exists in the art for a new and improved product dispenser which comprises a touchless flowable product dispenser for dispensing food products into a container such as, for example, a souffle cup or the like. An additional need exists in the art for a new and improved product dispenser which comprises a touchless flowable product dispenser for dispensing food products directly onto a food item, such as, for example, hamburgers, French fries, nachos, salads, and the like. Still another need exists in the art for a new and improved product dispenser which comprises a touchless flowable product dispenser for dispensing food products, such as, for example, condiments to be placed upon food items. Yet still another need exists in the art for a new and improved product dispenser which comprises a touchless flowable product dispenser for dispensing food products, such as, for example, hot or cold beverages into a container, such as, for example, a souffle cup or the like.

Overall Objectives of the Invention

An overall objective of the present invention is to provide a new and improved product dispenser. Another overall objective of the present invention is to provide a new and improved product dispenser which comprises a touchless flowable product dispenser. Still another overall objective of the present invention is to provide a new and improved product dispenser which comprises a touchless flowable product dispenser for dispensing food products. Yet another overall objective of the present invention is to provide a new and improved product dispenser which comprises a touchless flowable product dispenser for dispensing food products into a container such as, for example, a souffle cup or the like. An additional overall objective of the present invention is to provide a new and improved product dispenser which comprises a touchless flowable product dispenser for dispensing food products directly onto a food item, such as, for example, hamburgers, French fries, nachos, salads, and the like. Still another overall objective of the present invention is to provide a new and improved product dispenser which comprises a touchless flowable product dispenser for dispensing food products, such as, for example, condiments to be placed upon food items. Yet still another overall objective of the present invention is to provide a new and improved product dispenser which comprises a touchless flowable product dispenser for dispensing food products, such as, for example, hot or cold beverages into a container, such as, for example, a souffle cup or the like.

SUMMARY OF THE INVENTION

In accordance with the principles and teachings of the present invention, there is disclosed a new and improved touchless flowable product dispenser for dispensing food products, such as, for example, various condiments to be placed upon food items and which may be dispensed into a suitable container, such as, for example, a souffle cup or the like, or for dispensing such food products directly onto a food item, or alternatively, the food product may be a beverage. More particularly, it is seen that the new and improved touchless flowable product dispenser essentially comprises a canister or bag containing the food product to be dispensed, a tube extending from a food product outlet port of the canister or bag to a food product dispensing outlet port of the touchless flowable product dispenser, and a peristaltic pump interposed between the food product outlet port of the canister or bag to a food product dispensing outlet port of the touchless flowable product dispenser. When a food product container, such as, for example, a souffle cup or the like, or when a food item, or when a person's hand is waved in front of a suitable sensor, the peristaltic pump is actuated for one rotational cycle whereby a precisely predetermined amount of food product is dispensed from the food product dispensing outlet port of the touchless flowable product dispenser into the container or onto the food item. Alternatively, in lieu of the sensor, a pushbutton mechanism may be incorporated within the dispensing system. In addition, the peristaltic pump may be repetitively actuated so as to sequentially discharge or dispense precisely predetermined amounts of food product, or still yet further, the pushbutton mechanism may be continuously activated by exerting a push force upon the pushbutton mechanism such that the peristaltic pump will continuously dispense or discharge the food product until the push force, exerted upon the pushbutton mechanism, is removed.

BRIEF DESCRIPTION OF THE DRAWINGS

Various other features and attendant advantages of the present invention will be more fully appreciated from the following detailed description when considered in connection with the accompanying drawings in which like reference characters designate like or corresponding parts throughout the several views, and wherein.

DETAILED DESCRIPTION OF THE ILLUSTRATED EMBODIMENTS

Figure 1:
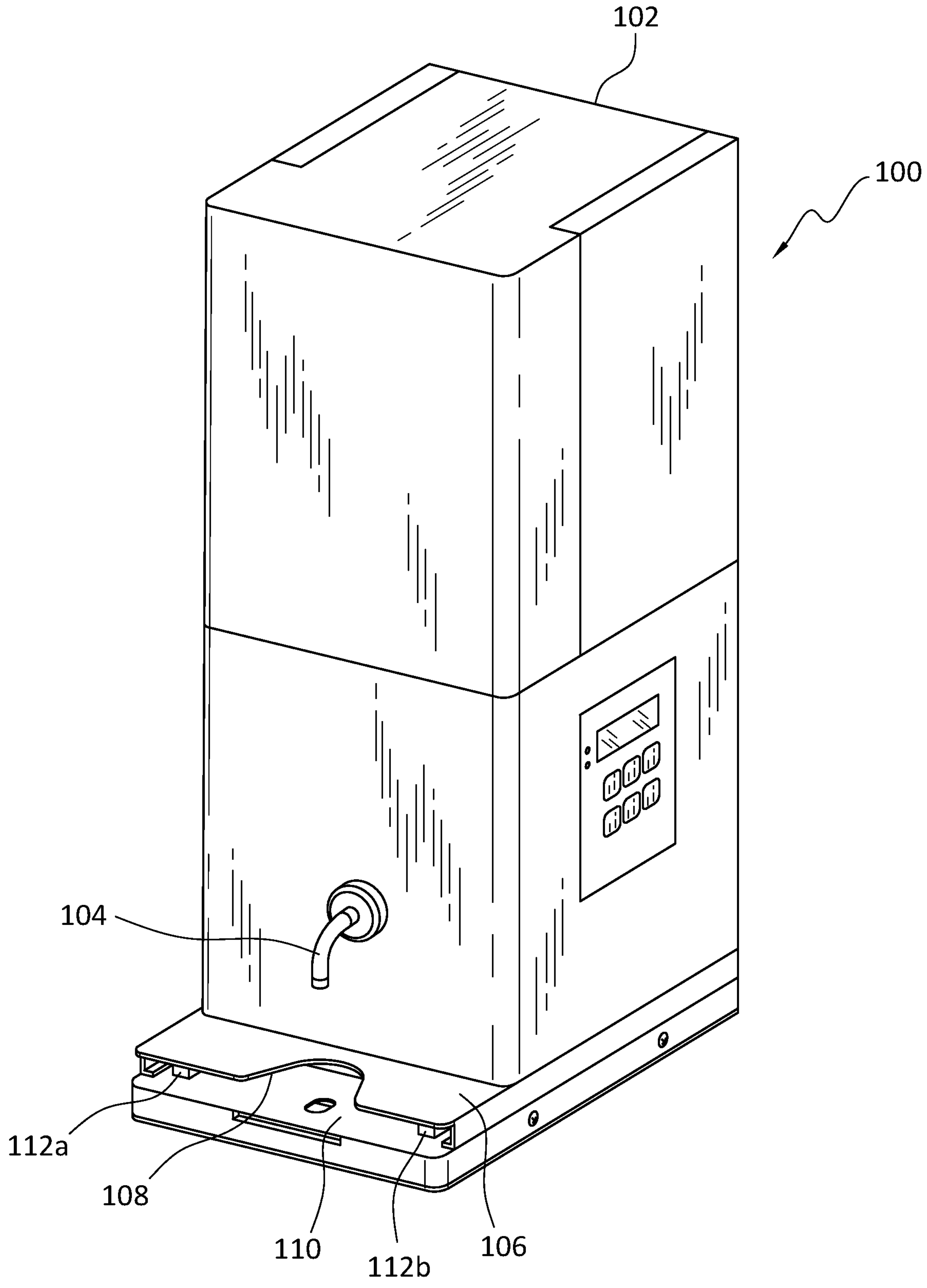
FIG. 1 is a schematic front, right side, top perspective view of a first embodiment of a new and improved touchless flowable product dispenser as constructed in accordance with the principles and teachings of the present invention.

Referring now to the drawings, and more particularly to FIG. 1 thereof, a first embodiment of a new and improved touchless flowable product dispenser, as constructed in accordance with the principles and teachings of the present invention, is disclosed and is generally indicated by the reference character 100. More particularly, it is seen that the first embodiment of the new and improved touchless flowable product dispenser 100 is seen to comprise a housing 102 within which a flowable product dispensing system, to be disclosed more fully hereinafter, is disposed such that the flowable product can in fact be dispensed from a flowable product output dispensing spout, port, or nozzle 104. At the bottom of the housing 102, there is provided a horizontally oriented bracket 106 which is provided with a centrally located arcuately-configured cut-out section 108 which is adapted to accommodate a suitably sized cup or similar container, not shown, into which a precisely metered supply of the flowable product can be dispensed from the flowable product output dispensing spout, port, or nozzle 104. It is also noted that the lowermost portion of the housing 102 is provided with a horizontally oriented support platform 110, which is disposed beneath the horizontally oriented bracket 106 such that the bracket 106 is disposed above and effectively overhangs the support platform 110.

Therefore, it can be readily appreciated that the suitably sized cup or similar container, not shown, is adapted to be supported upon the support platform 110 wherein the lower portion of the cup or container will be confined within the arcuately shaped cut-out section 108 of the bracket 106. Lastly, it is seen that a suitable sensor, such as, for example, a through-beam sensor, comprising a light beam transmitter 112*a* and a light beam receiver 112*b*, is interposed between the support platform 110 and the bracket 106. Accordingly, when a cup or container is disposed upon the support platform 110, and disposed within the arcuately shaped or semi-circular cut-out section 108 of the bracket 106, the cup or container will block the transmitter/receiver components 112*a*, 112*b* which normally emits, for example, a visible or infrared light beam, whereby the touchless flowable product dispenser will now know that a cup or container is physically present beneath the flowable product output dispensing spout, port, or nozzle 104 and will dispense a precisely metered amount of the flowable product from a flowable product storage canister, not shown but which will be disclosed and described hereinafter, disposed internally within the housing 102. It is to be noted that while the first embodiment 100 of the new and improved touchless flowable product dispenser of the present invention is disclosed as comprising a single flowable product output dispensing spout, port, or nozzle 104, more than one flowable product output dispensing spouts or ports may be provided upon a single housing 102.

Figure 2:
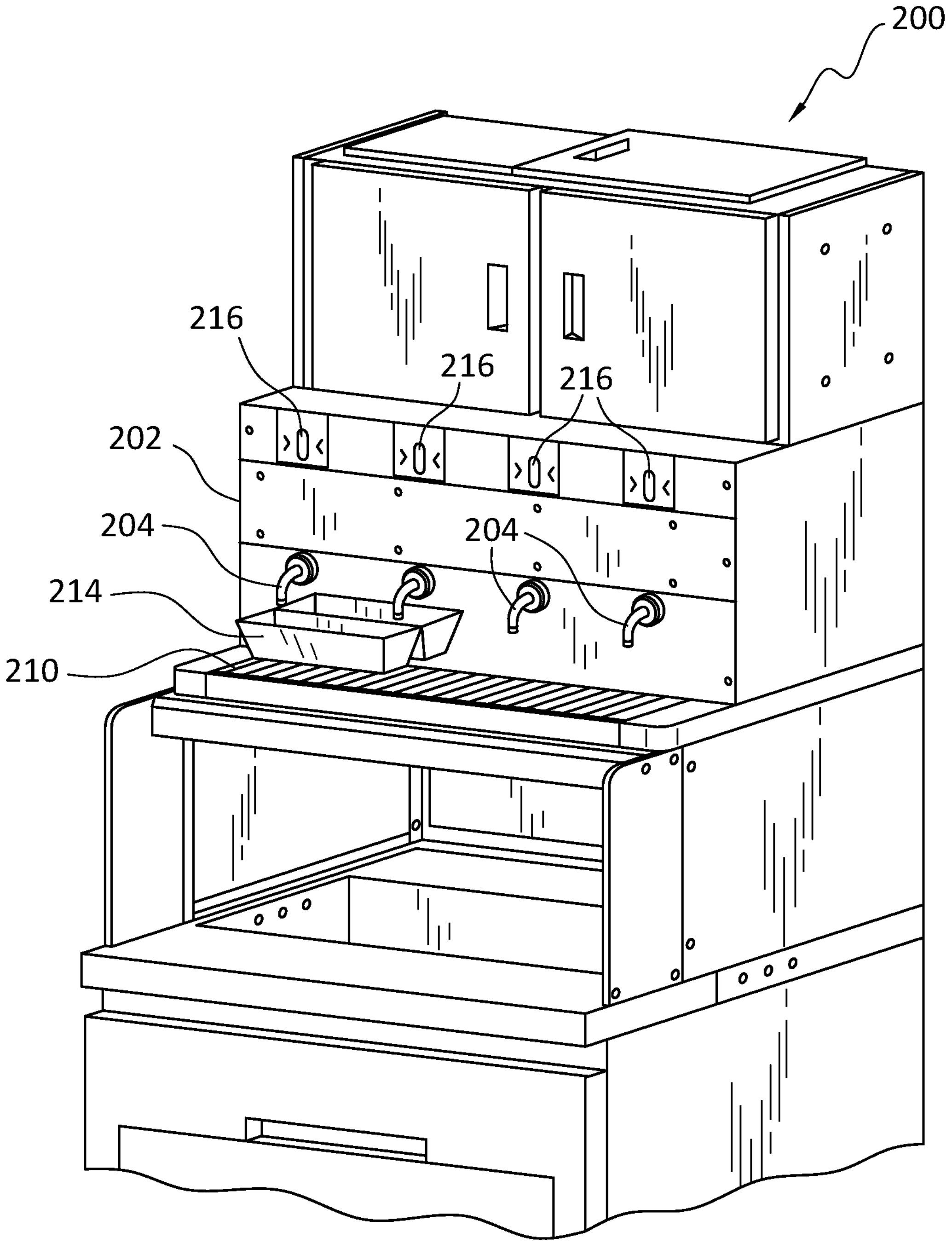
FIG. 2 is a schematic front, right side, top perspective view of a second embodiment of a new and improved touchless flowable product dispenser as constructed in accordance with the principles and teachings of the present invention.

With reference now being made to FIG. 2, a second embodiment of a new and improved touchless flowable product dispenser, as constructed in accordance with the principles and teachings of the present invention, is disclosed and is generally indicated by the reference character 200. It is to be noted that the second embodiment 200 of the present invention comprises structural components which are similar to structural components present within the first embodiment 100 of the present invention, and therefore such similar structural components will be provided with reference numbers corresponding to the reference numbers noted in connection with the first embodiment 100 of the present invention, however, they will be within the 200 series. It is further noted that the description of the second embodiment 200 of the present invention will be directed toward those structural components which are different from the structural components of the first embodiment 100 of the present invention. More particularly, it is seen, for example, that in lieu of a single flowable product output dispensing spout or port 104, the second embodiment 200 of the new and improved touchless flowable product dispenser comprises four (4) flowable product output dispensing spouts, ports, or nozzles 204, all of which are mounted upon the housing 202 and all of which are individually operatively associated with respective flowable product dispensing mechanisms, not shown in FIG. 2 but which will become apparent hereinafter, which are disposed internally within the housing 202.

Another significant difference between the first embodiment 100 of the new and improved touchless flowable product dispenser and the second embodiment 200 of the new and improved touchless flowable product dispenser is that the second embodiment 200 of the new and improved touchless flowable product dispenser is adapted to provide touchless flowable product dispensing to food items that are not adapted to be contained within a cup or similar container. Accordingly, while a support platform 210 is provided, the support platform 210 is provided for supporting food containers 214 within which various food items are disposed and upon which a particular flowable product or condiment can be dispensed from a particular one of the plurality of flowable product output dispensing spouts, ports, or nozzles 204. Still further, it is seen that the bracket 106 and cut-out section 108, for accommodating the lower portion of a cup or container, have been eliminated, as well as the through-beam transmitter/receiver sensor 112*a*, 112*b*, and in lieu thereof, each one of the flowable product output stations, as defined by means of each one of the plurality of flowable product output dispensing spouts, ports, or nozzles 204, is provided with a hand-wave proximity sensor 216. Accordingly, when a patron wants to have a particular condiment dispensed onto the food disposed within the food container 214, the patron simply waves or moves his hand in front of the proximity sensor 216 so as to activate the condiment dispensing equipment as will be more fully disclosed hereinafter.

Figure 3:
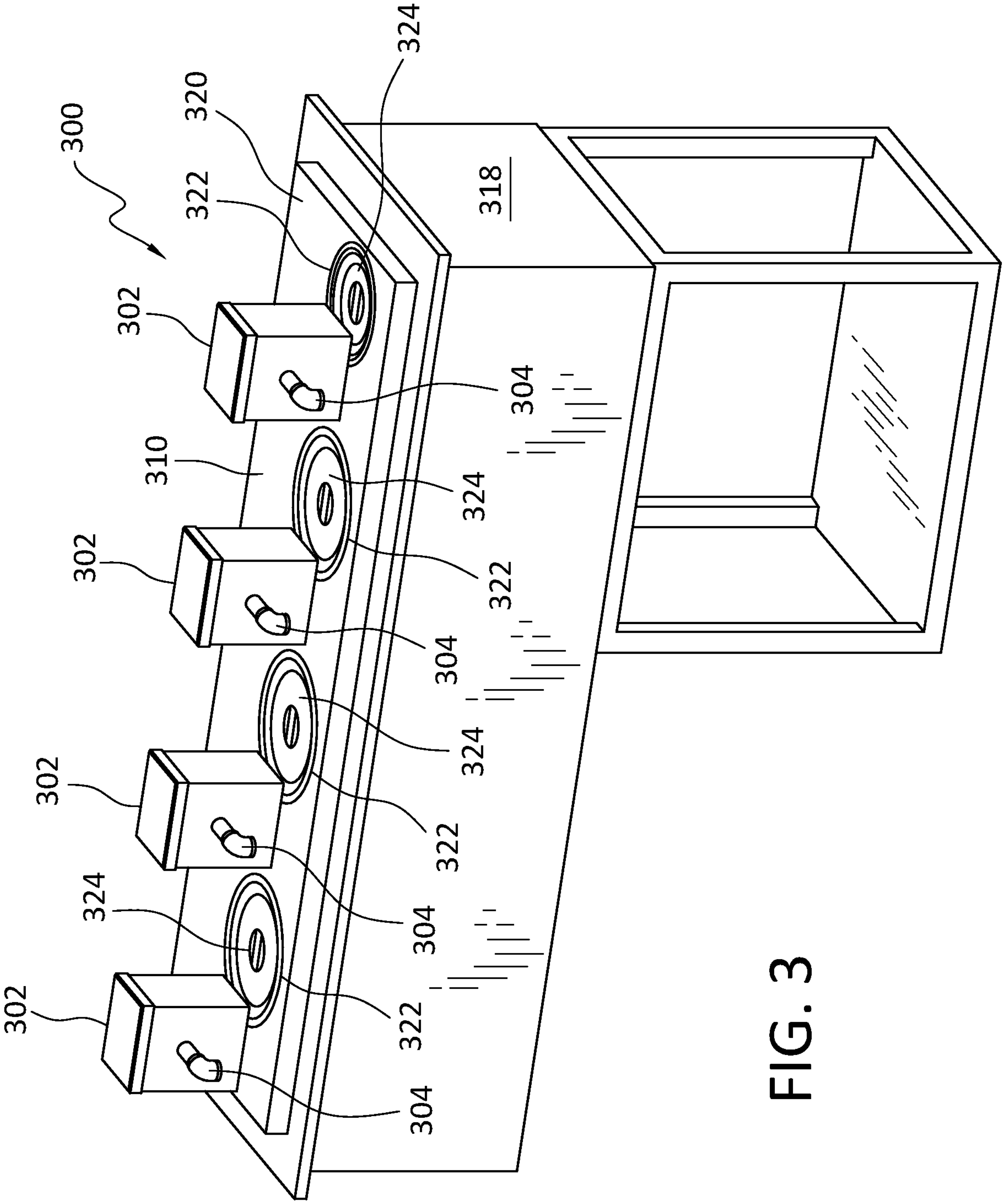
FIG. 3 is a schematic front, right side, top perspective view of a third embodiment of a new and improved touchless flowable product dispenser as constructed in accordance with the principles and teachings of the present invention.

With reference now being made to FIG. 3, a third embodiment of a new and improved touchless flowable product dispenser, as constructed in accordance with the principles and teachings of the present invention, is disclosed and is generally indicated by the reference character 300. It is to be noted that the third embodiment 300 of the present invention comprises structural components which are similar to structural components present within the first and second embodiments 100,200 of the present invention, and therefore such similar structural components will be provided with reference numbers corresponding to the reference numbers noted in connection with the first and second embodiments 100,200 of the present invention, however, they will be within the 300 series. It is further noted that the description of the third embodiment 300 of the present invention will be directed toward those structural components which are different from the structural components of the first and second embodiments 100,200 of the present invention. More particularly, it is seen for example, that while in the first embodiment 100 of the present invention, a single flowable product output dispensing spout, port, or nozzle 104 was mounted upon the housing 102, while in the second embodiment 200 of the present invention, multiple, or a plurality of, flowable product output dispensing spouts, ports, or nozzles 204 were mounted upon the housing 202, in accordance with the third embodiment 300 of the present invention, each flowable product output dispensing spout, port, or nozzle 304 is mounted upon its individual housing 302, and the plurality of housings 302 are aligned with each other within a horizontally extending array so as to define laterally separated condiment dispensing stations, each station dispensing a different condiment.

Several other additional structural differences for this third embodiment 300 of the present invention are also to be noted. For example, all of the individual housings 302 are adapted to be mounted upon another major housing or mounting bracket, not shown. Still further, a support platform, not shown but similar to the support platform 110 of the first embodiment 100 of the present invention, is to be provided beneath the plurality of dispensing ports or spouts 304, and a bracket, also not shown but similar to the bracket 106 of the first embodiment 100 of the present invention will also be provided, along with arcuately shaped cut-out sections and sensors/transmitters/receivers similar to the arcuately shaped cut-out section 108 and the transmitter/receiver 112*a*, 112*b* of the first embodiment 100 of the present invention. Still yet further, these laterally separated condiment dispensing stations are adapted to dispense cooled or chilled condiments. Accordingly, the flowable product storage cannisters, not shown, will be disposed within a cabinet 318 within which cooling equipment, such as, for example, compressors and the like, that are utilized in conjunction with refrigerators, freezers, or air conditioners, not shown, will also be disposed. Lastly, it is seen that the upper surface of the cabinet 318 comprises a deck 320 which is provided with a plurality of laterally spaced apertures 322 having covers 324 covering the same. These apertures 322 and covers 344 provide access to the flowable product storage canisters disposed within the cabinet 318 so as to enable replacement of a particular canister when its supply of condiment is exhausted.

Figure 4:
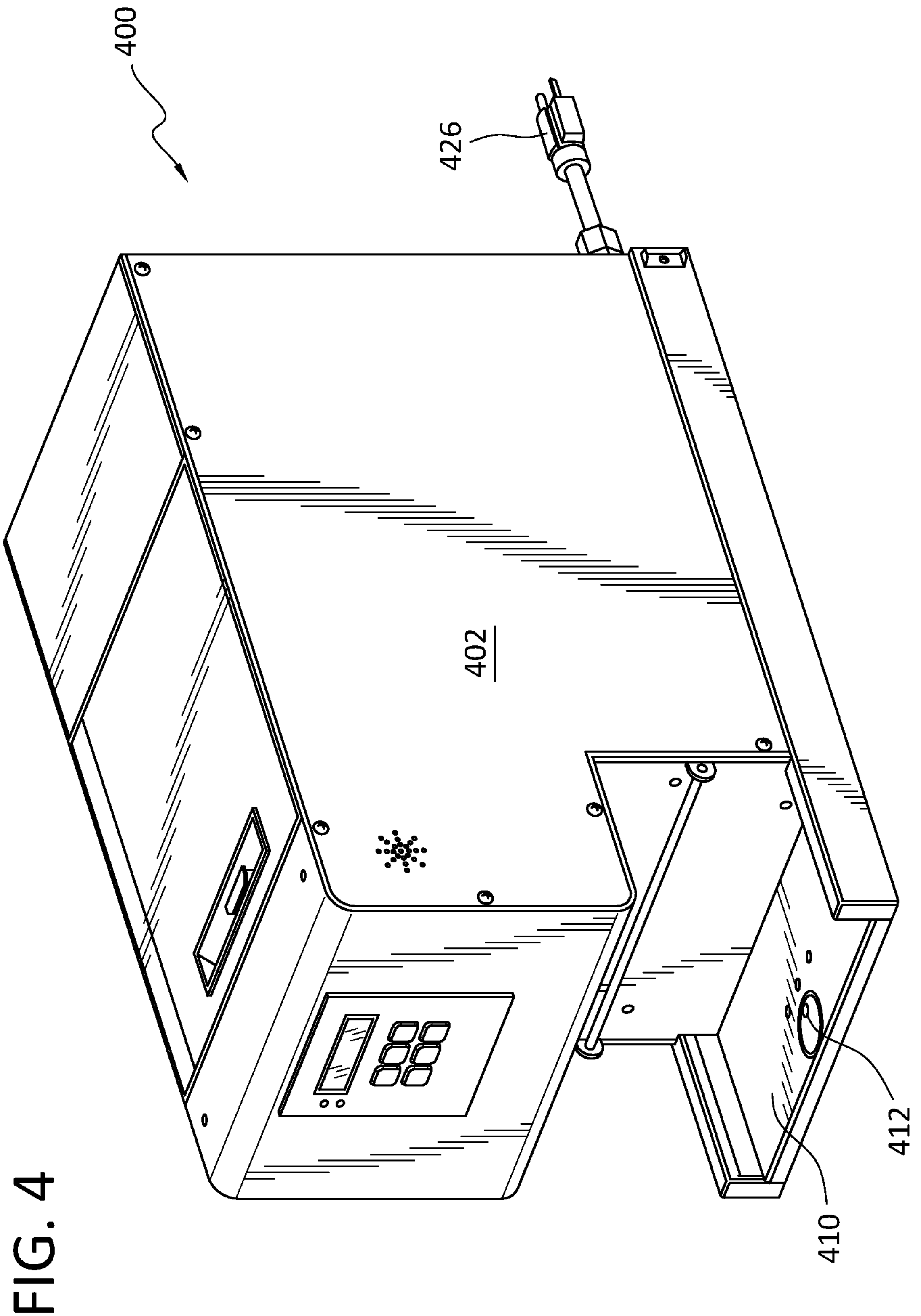
FIG. 4 is a schematic front, right side, top perspective view of a fourth embodiment of a new and improved touchless flowable product dispenser as constructed in accordance with the principles and teachings of the present invention.

With reference now being made to FIG. 4, a fourth embodiment of a new and improved touchless flowable product dispenser, as constructed in accordance with the principles and teachings of the present invention, is disclosed and is generally indicated by the reference character 400. It is to be noted that the fourth embodiment 400 of the present invention comprises structural components which are similar to structural components present within the first, second, and third embodiments 100,200,300 of the present invention, and therefore such similar structural components will be provided with reference numbers corresponding to the reference numbers noted in connection with the first, second, and third embodiments 100,200, 300 of the present invention, however, they will be within the 400 series. It is further noted that the description of the fourth embodiment 400 of the present invention will be directed toward those structural components which are different from the structural components of the first, second, and third embodiments 100,200,300 of the present invention. More particularly, it is seen that the fourth embodiment 400 of the new and improved touchless flowable product dispenser of the present invention comprises a housing 402, a support platform 410, and a through-beam sensor 412 disposed within the central part of the platform 410. In addition, in accordance with the principles and teachings of this fourth embodiment 400 of the present invention, the flowable product storage canisters, not shown, disposed internally within the housing 402 are adapted to be heated by any suitable heating components, such as, for example, heating coils placed within the vicinity of the flowable product storage canisters or even integrally embedded within the surrounding walls of the flowable product storage canisters. In this manner, the flowable product is pre-heated, and maintained at a predetermined temperature, prior to its dispensing onto a food item. Lastly, while all of the new and improved embodiments of the touchless flowable product dispensers are provided with electrical power so as to enable the peristaltic pumps, the sensors, and the heating and cooling equipment to operate, an electrical power cord 426 is actually seen in FIG. 4 as being electrically connected to the housing 402.

Figure 5:
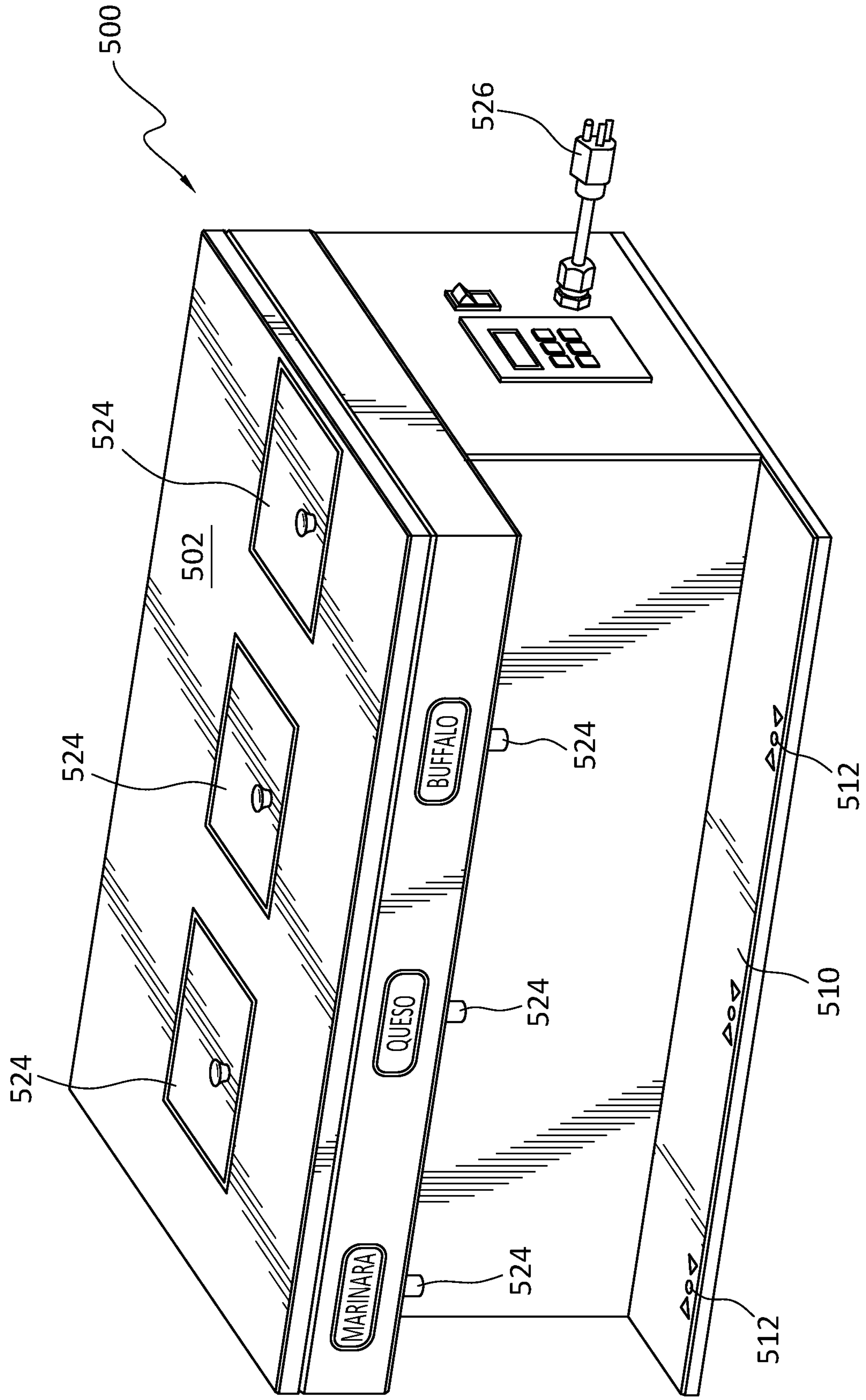
FIG. 5 is a schematic front, right side, top perspective view of a fifth embodiment of a new and improved touchless flowable product dispenser as constructed in accordance with the principles and teachings of the present invention.

With reference now being made to FIG. 5, a fifth embodiment of a new and improved touchless flowable product dispenser, as constructed in accordance with the principles and teachings of the present invention, is disclosed and is generally indicated by the reference character 500. It is to be noted that the fifth embodiment 500 of the present invention comprises structural components which are similar to structural components present within the first, second, third, and fourth embodiments 100,200,300, 400 of the present invention, and therefore such similar structural components will be provided with reference numbers corresponding to the reference numbers noted in connection with the first, second, third, and fourth embodiments 100,200,300,400 of the present invention, however, they will be within the 500 series. It is further noted that the description of the fifth embodiment 500 of the present invention will be directed toward those structural components which are different from the structural components of the first, second, third, and fourth embodiments 100,200,300,400 of the present invention. More particularly, it is seen that the fifth embodiment 500 of the new and improved touchless flowable product dispenser of the present invention is similar to the fourth embodiment 400 touchless flowable product dispenser 400 in that it comprises a housing 502, and a support platform 510, however, in the fifth embodiment 500 of the touchless flowable product dispenser 500 there is provided a plurality of aligned, laterally spaced dispensing stations each one of which comprises a through-beam sensor 512 disposed within the laterally spaced parts of the platform 510, as well as a plurality of flowable product output ports, spouts, or nozzles 504. In addition, as was the case for the fourth embodiment 400 of the present invention, the flowable product storage canisters, not shown, disposed internally within the housing 502 are adapted to be heated by any suitable heating components, such as, for example, heating coils placed within the vicinity of the flowable product storage canisters or even integrally embedded within the surrounding walls of the flowable product storage canisters. Again, in this manner, the flowable product is pre-heated, and maintained at a predetermined temperature, prior to its dispensing onto a food item.

Figure 6:
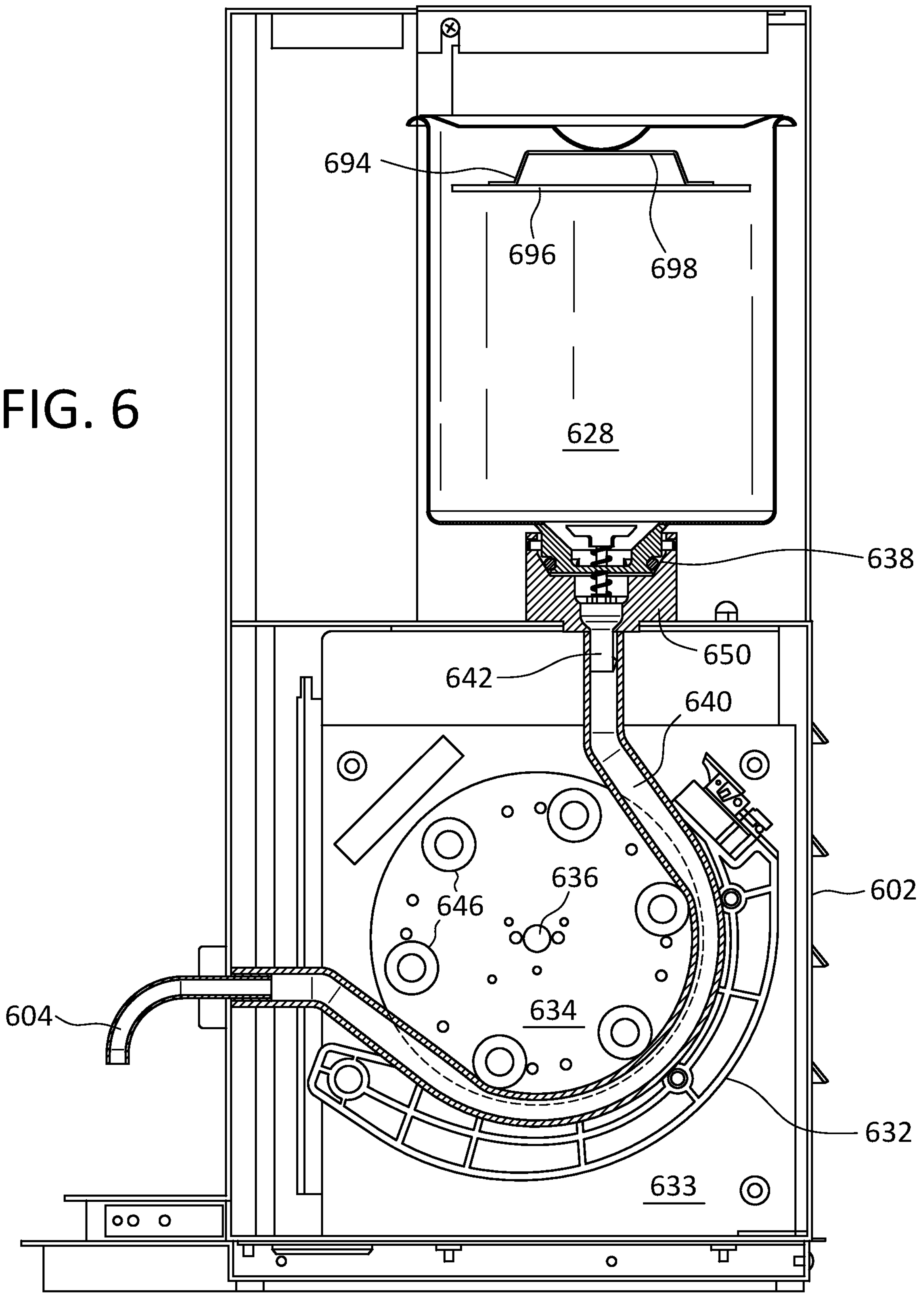
FIG. 6 is effectively a cross-sectional view of one embodiment of the new and improved touchless flowable product dispenser of the present invention, showing, in particular, the peristaltic pump and how it operates to dispense a flowable product.

With reference now being made to FIG. 6, there is discloU98sed a first embodiment of a typical flowable product storage canister 628 within which a predetermined amount of a particular flowable product, not shown, is stored for dispensing when a predetermined amount of the flowable product is to be dispensed. More particularly, the touchless flowable product dispenser of the present invention comprises a housing 602, which can be similar to any one of the housings 102,202,302,402,502 previously noted in connection with the description of any one of the first through fifth embodiments, and within the housing 602, a peristaltic pump 632 is fixedly mounted within or upon a suitable housing or mounting bracket 633 such that a rotor 634 of the peristaltic pump 632 can rotate around a horizontally oriented rotary axle 636 when the peristaltic pump 632 is actuated. A dispensing valve mechanism or assembly 638, which will be described in more detail hereinafter, is mounted upon the bottom of the flowable product storage canister 628 such that when the flowable product storage canister 628 is mounted upon the peristaltic pump housing or mounting bracket 633, the dispensing valve mechanism 638 will automatically be moved to its OPEN position so as to permit dispensing of the flowable product out from the flowable product storage canister 628 when the peristaltic pump 632 is activated, whereas, to the contrary, when the flowable product storage canister 628 has been removed from the peristaltic pump housing or mounting bracket 633, the dispensing valve mechanism 638 will automatically be moved to its CLOSED position so as to prevent any leakage of the flowable product out from the flowable product storage canister 628. It is also noted that a flexible, compressible tube 640 has one end fixedly attached to an output port 642 of the dispensing valve mechanism, while an opposite end of the flexible, compressible tube 640 is fixedly attached to an inlet end of a flowable product output dispensing spout, port, or nozzle 604 which may be similar to any one of the previously noted flowable product output dispensing spouts, ports, or nozzles 104,204,304,504. It is further noted that the flexible, compressible tube 640 is routed around the outer periphery of the peristaltic pump rotor 634. Still further, different flexible, compressible tubes, having for example, different internal diametrical dimensions, can be utilized so as to enable different flowable products, characterized by different viscosities, to flow therethrough without any fluid flow problems. It is of course to be appreciated that the connections for the opposite ends of the different tubes would have to also be changed so as to accommodate the different sized tubes.

As is well known in the art, the rotor of a peristaltic pump, in its simplest form or structure, comprises a rotor having two diametrically opposite sides provided with rollers or cams. As the rotor rotates, the rollers or cams, disposed upon the diametrically opposite sides of the rotor, operatively cooperate with internal peripheral wall portions of the pump housing assembly such that as a first one of the rollers or cams engages and compresses a first section of the flexible, compressible tube, that first roller or cam occludes that first section of the flexible, compressible tube such that flowable product cannot flow beyond that first roller or cam. At the same time, the second, diametrically opposite roller or cam, which has also been occluding a second section of the flexible, compressible tube, is disengaged from the flexible, compressible tube such that flowable product, trapped within that section of the flexible, compressible tube which was interposed between the first and second rollers or cams, is now able to escape from the second section of the flexible, compressible tube such that a precise, predetermined volume of flowable product can in fact be dispensed, it of course being realized that the rollers or cams are constantly rolling along the compressed flexible, compressible tube so as to constantly cause the flowable product to move along the tube. This operation is known as peristalsis whereby precise predetermined volumes of flowable product are dispensed as desired. As can therefore be appreciated, the volume of fluid or flowable product, that is to be dispensed at any one time, is defined by means of the volume of that section of the flexible, compressible which is interposed between the rollers or cams. More particularly, as is illustrated within FIG. 6, the particular rotor 634 of the present invention is provided with six (6) rollers or cams 646 which are mounted upon the rotor 634 in an equiangularly spaced array, although, of course, a different number of rollers or cams 646 may be utilized for different flow volumes as may be needed or desired.

With reference now being made to FIGS. 6-9, the valve mechanism or assembly 638 will be more explicitly illustrated and described. As can best be seen from FIG. 9, the valve mechanism 638 is mounted within a valve mounting block 648 which is fixedly mounted upon the bottom of the flowable product storage canister 628 as can best be seen in FIG. 8. In turn, a flowable product dispensing block 650, which includes the flowable product output port 642 to which one end of the flexible, compressible tube 640 is to be fixedly attached as was shown in FIG. 6, is adapted to be fixedly attached to the upper end of the peristaltic pump housing 633 as can also be appreciated from FIG. 6.

Figure 8:
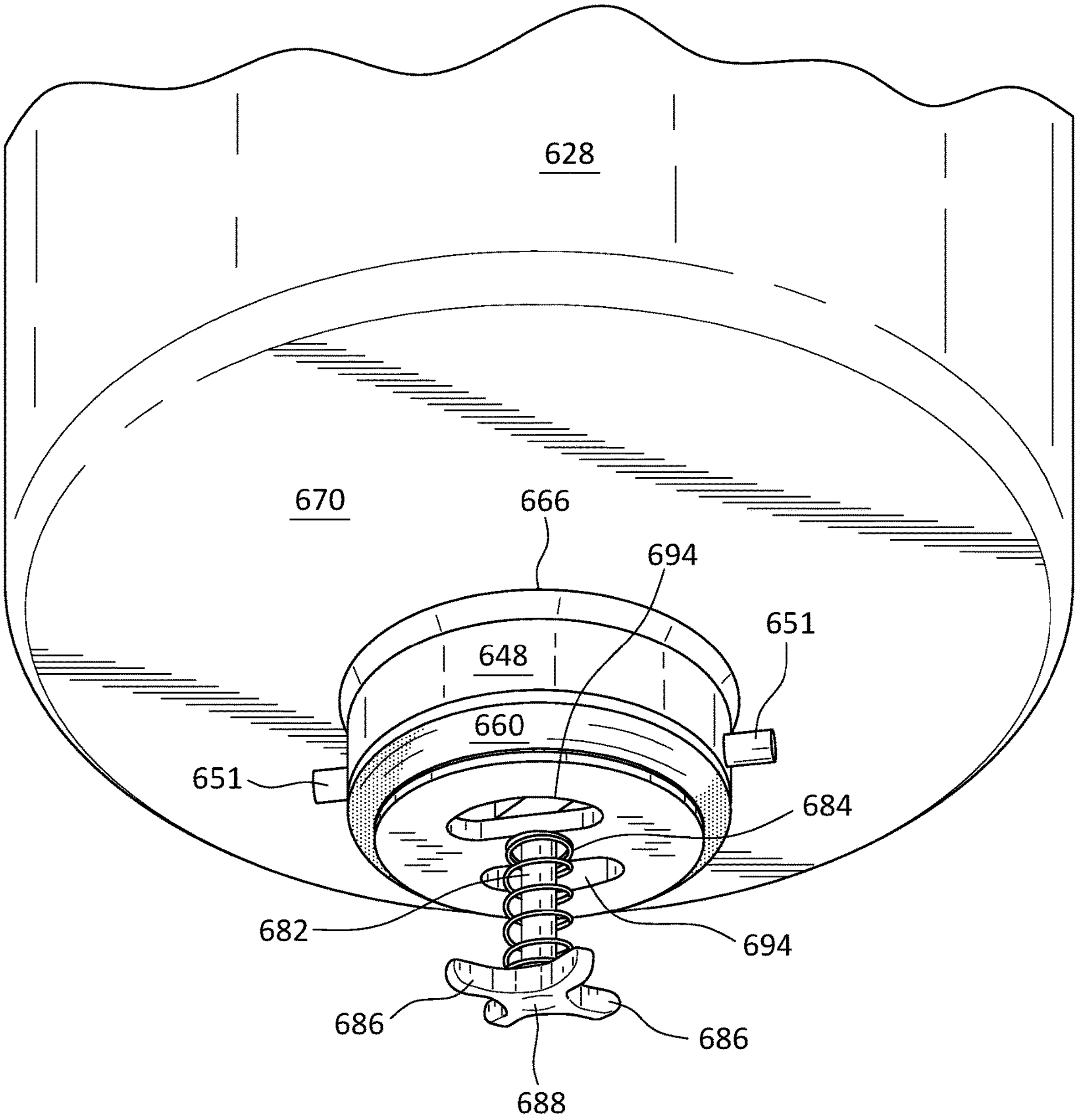
FIG. 8 is schematic bottom perspective view of the valve mechanism utilized within new and improved touchless flowable product dispenser of the present invention.

As can best be appreciated from FIG. 8, the valve mounting block 648 is adapted to be removably mounted upon or connected to, as well as dismounted or disconnected from, the flowable product dispensing block 650 by means of a suitable bayonet connection, the male members of the bayonet connection, fixedly mounted upon the valve mounting block 648, being shown as radially outwardly projecting, diametrically opposed pins 651 in FIG. 8. The flowable product output port 642 is seen to be fluidically connected a first bore 652 defined within the flowable product dispensing block 650, wherein the first bore 652 has a first predetermined diametrical extent. The first bore 652, in turn, is fluidically connected to a second bore 654 which is also defined within the flowable product dispensing block 650 and is seen to have a diametrical extent which is greater than that of the first bore 652, the first and second bores 652,654 effectively meeting or being smoothly connected or melded to each other by means of an annular shoulder portion 656. It is lastly seen that the upper part of the flowable product dispensing block 650 is provided with a substantially frustoconical bore section 658 which is adapted to accommodate the lower end portion of the valve mounting block 648 when the valve mounting block 648 is fixedly mounted upon the flowable product dispensing block 650 by means of the aforenoted bayonet connection, and an annular O-ring 660 is fixedly mounted upon the lower external portion of the valve mounting block 648 so as to provide a tight seal between the flowable product dispensing block 650 and the valve mounting block 648, when the valve mounting block 648 is fixedly mounted upon the flowable product dispensing block 650, so as to prevent any leakage of the flowable product out from the valve mounting block 648 and the flowable product dispensing block 650.

Figure 7:
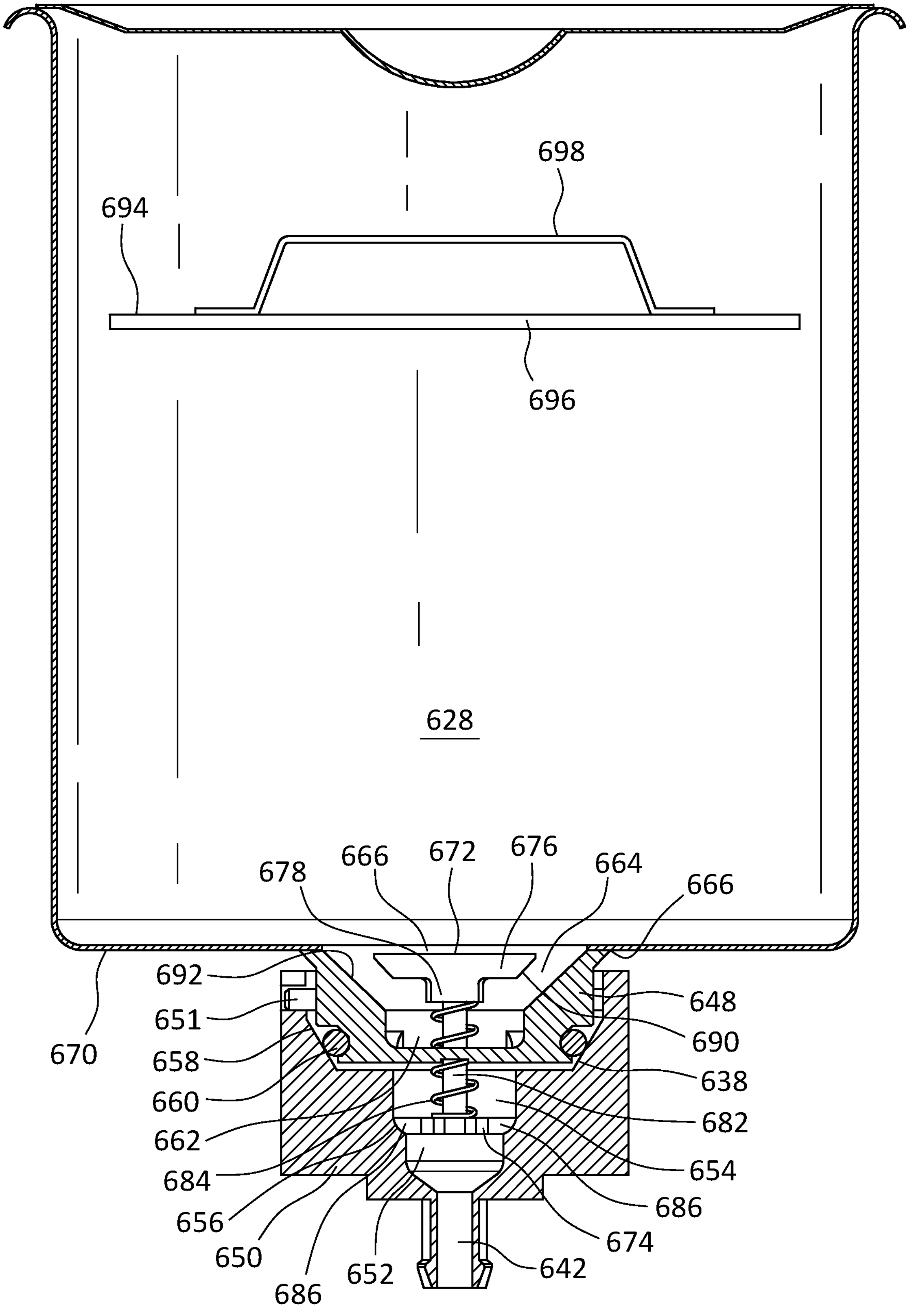
FIG. 7 is an enlarged cross-sectional view of the touchless flowable product dispenser disclosed within FIG. 6 so as to clearly disclose the various operative components thereof including a first type of puck disposed atop the flowable product inside of a flowable product storage canister.
Figure 9:
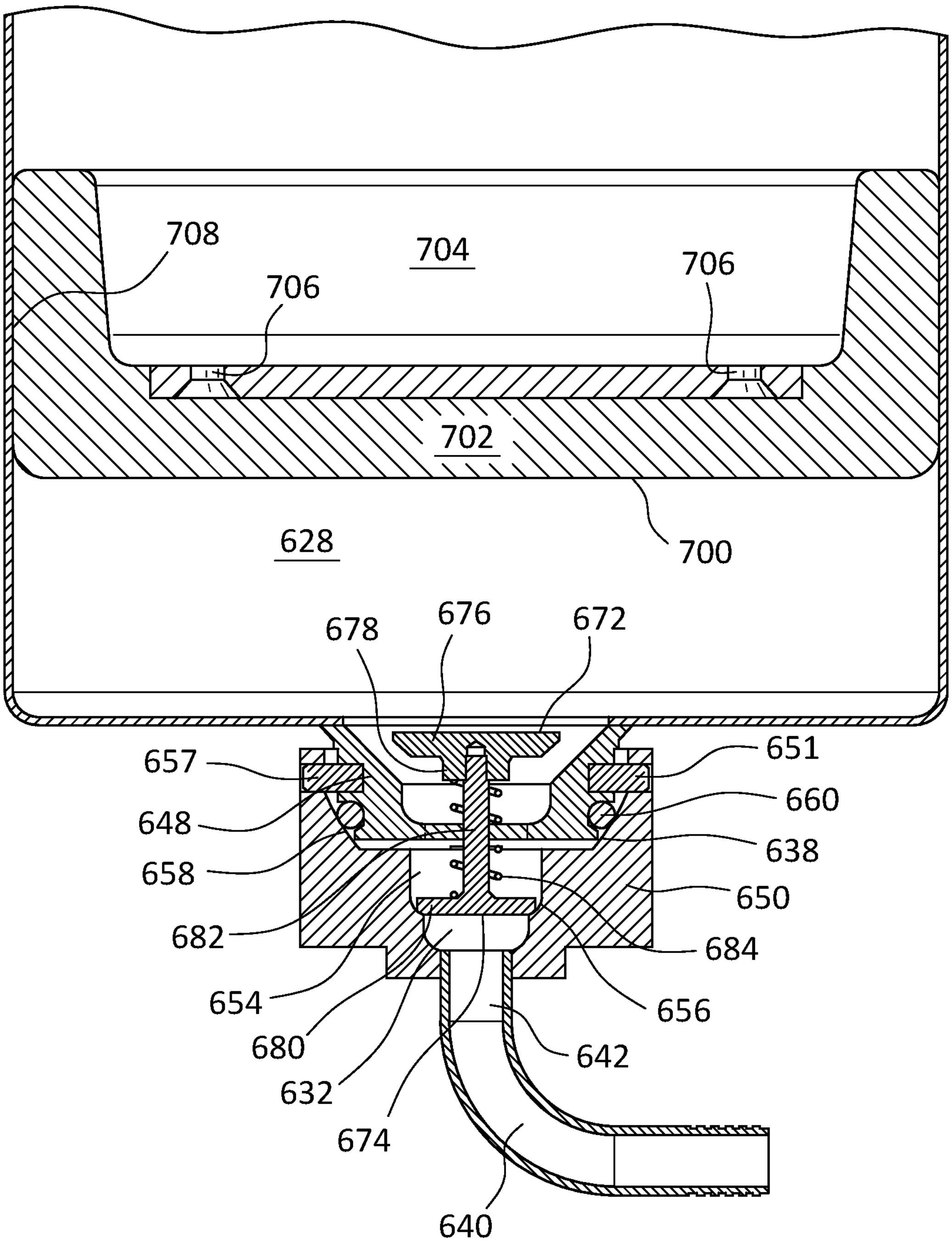
FIG. 9 is effectively a cross-sectional view of another embodiment of the new and improved touchless flowable product dispenser of the present invention, similar to the embodiment illustrated within FIG. 7, showing, however, the use of a different type of puck disposed atop the flowable product stored within the flowable product storage canister.

With reference still being made to FIGS. 7-9, the actual flowable product control valve of the valve mechanism or assembly 638 will now be described. More particularly, it is first seen that the valve mounting block 648 comprises a lower axial cylindrical bore 662 and an upper frustoconically shaped bore 664 fluidically connected to the lower bore 662 at its lower end and fluidically connected to an outflow aperture or opening 666 defined within the bottom wall 670 of the flowable product storage cannister 628 as can best be appreciated from FIGS. 7 and 8. The actual flowable product control valve can best be appreciated from FIG. 9 and is seen to comprise a first, substantially T-shaped upper member 672 and a second, inverted, substantially T-shaped lower member 674. The first, substantially T-shaped upper member 672 comprises a transversely oriented upper portion 676 and an axially extending stem portion 678, while the second, inverted, substantially T-shaped lower member 674 comprises a transversely oriented lower portion 680 and an axially extending stem portion 682 wherein the upper end of the stem portion 682 of the second, inverted, substantially T-shaped lower member 674 is fixedly embedded within the stem portion 678 of the first, substantially T-shaped upper member 672.

As can be further appreciated, a coiled spring 684 is coaxially disposed around the axially extending stem portion 682 of the second, inverted, substantially T-shaped lower member 674 such that the upper end of the coiled spring 684 is engaged with an undersurface portion of the stem portion 678 of the first, substantially T-shaped upper member 672, while a lower end of the coiled spring 684 is engaged with an axially located upper surface portion of the second, inverted, substantially T-shaped lower member 674. It is of course to be appreciated that both the coiled spring 684 and the axially extending stem portion 682 of the lower member 674 pass through a hole defined within the bottom portion of the valve mounting block 648, as can best be appreciated from FIGS. 7 and 8. It is also to be noted that while the transversely oriented upper portion 676 of the first, substantially T-shaped upper member 672 comprises a solid annular disk, the transversely oriented lower portion 680 of the second, inverted, substantially T-shaped lower member 674 actually comprises four equiangularly spaced spokes, arms, or legs 686 projecting radially outwardly from a central portion 688 of the second, inverted, substantially T-shaped lower member 674 as can best be seen in FIG. 8.

Lastly, it is also to be appreciated that the annular periphery 690 of the transversely oriented upper portion 676 of the first, substantially T-shaped upper member 672 has a frustoconical configuration, while the upper internal walls of the valve mounting block 648, which define the upper frustoconically shaped bore 664, also define a frustoconically shaped valve seat 692 for the annular periphery 690 of the transversely oriented upper portion 676 of the first, substantially T-shaped upper member 672. Therefore, as can best be appreciated from FIG. 7, when the flowable product storage canister 628 is fixedly mounted upon the flowable product dispensing block 650 as a result of the aforenoted bayonet connection, the four radially outwardly projecting spokes, arms, or legs 686 of the second, inverted, substantially T-shaped lower member 674 will be seated within the annular shoulder portion 656 defined between the first and second bores 652 and 654 such that the axially oriented stem portion 682 of the second, inverted, substantially T-shaped lower member 674 will force the first substantially T-shaped upper member 672 of the flowable product control valve to move upwardly thereby effectively raising the transversely oriented upper portion 676 of the first, substantially T-shaped upper member 672 and its annular peripheral portion 690 away from the annular valve seat 692.

Accordingly, flowable product, stored within the flowable product storage canister 628, can now flow into the annular frustoconical bore 664, past the first, substantially T-shaped upper member 672 of the flowable product control valve, through the bore 662 defined within the valve mounting block 648, through a pair of holes 694 defined within the bottom portion of the valve mounting block 648, as best seen in FIG. 8, through the bore 654 defined within the flowable product dispensing block 650, past the plurality of radially outwardly projecting spokes, arms, or legs 686 of the second, inverted, substantially T-shaped lower member 674 of the flowable product control valve, into the lower bore 652 defined within the flowable product dispensing block 650, and into the flowable product output port 642 such that a precise, predetermined amount of the flowable product can be dispensed when the rotor 634 of the peristaltic pump 632 is rotated a predeterminedly stepped or incremental amount. To the contrary, when the flowable product storage canister 628 is disconnected and removed from the flowable product dispensing block 650, the coiled spring 684 will force the second, inverted, substantially T-shaped lower member 674 of the flowable product control valve to move downwardly so as to, in turn, move the first, substantially T-shaped upper member 672 of the flowable product control valve downwardly whereby the annular peripheral portion 690 of the first, substantially T-shaped upper member 672 will again be seated upon its valve seat 692 of the valve mounting block 648 such that flowable product cannot leak out from the flowable product storage canister 628.

It is lastly to be noted that the motor drive, not shown, for the peristaltic pump 632 can be operated in reverse immediately after a particular flowable product dispensing operation or cycle has been completed. The reason for this is that it has been noted that upon completion of a particular dispensing operation or cycle, product may tend to nevertheless drip out from the flowable product dispensing nozzle. The operation of the peristaltic pump drive motor in a reverse mode tends to suck product away from the dispensing nozzle so as to resolve this potential problem. In a similar manner, it is noted that if the flowable product container or cup is removed from the flowable product dispensing station prior to completion of a complete flowable product dispensing cycle or operation, the sensor will transmit a signal to the peristaltic pump to cease its forward movement for dispensing and to immediately reverse movement so as to prevent further flowable product from being dispensed onto the dispensing station since the flowable product container or cup is no longer present at the flowable product dispensing station.

Continuing further, it has also been noted in conjunction with the dispensing of flowable products, that due to the viscosities of some flowable products, as the flowable product exits the axially central portion of the bottom of the flowable product storage canister 628, a vortex is effectively created at the exit of the canister 628. This vortex, in turn, can cause cavitation to occur at the exit of the canister 628 whereby the flowable product container 628 may not be completely evacuated, thereby leaving flowable product within the canister 628 that could otherwise be dispensed. In order to prevent these occurrences from happening, an evacuation puck can be utilized within the flowable product canister 628. One such evacuation puck is disclosed at 694 in FIGS. 6 and 7. The puck 694 may simply comprise a flat, sheet metal plate 696 which is provided with a manipulative handle 698 fixedly secured to an upper surface portion of the puck 694. The puck 694 is adapted to simply sit atop the flowable product stored within the flowable product storage canister 628 and thereby exert a predetermined downwardly directed force upon the flowable product so as to prevent the aforenoted vortex and cavitation problems from occurring.

It is noted that the diametrical extent of the puck 694 is somewhat less than the interior diametrical extent of the flowable product canister 628, however, the presence of the evacuation puck 694 nevertheless serves the desired purpose and achieves the desired result. Alternatively, as disclosed within FIG. 9, a second embodiment of an evacuation puck is shown at 700 and is seen to comprise a main body portion 702 which has a substantially U-shaped cross-sectional configuration and an upper handle portion 704 which is adapted to be fixedly secured to the lower body portion 702 by suitable fasteners 706. Contrary to the first embodiment puck 694, the second embodiment puck has a diametrical extent just slightly smaller than the internal diametrical extent of the flow product storage canister 628 such that as the supply of the flowable product is gradually depleted or exhausted, the annular peripheral portion 708 of the evacuation puck 700 will engage the internal peripheral surface portion of the flowable product canister 628 and thereby effectively scrape or wipe down the internal peripheral surface portion of the flowable product storage canister 628 so as to ensure that substantially all of the flowable product, disposed within the flowable product storage canister 628, will be evacuated and dispensed.

Figure 10:
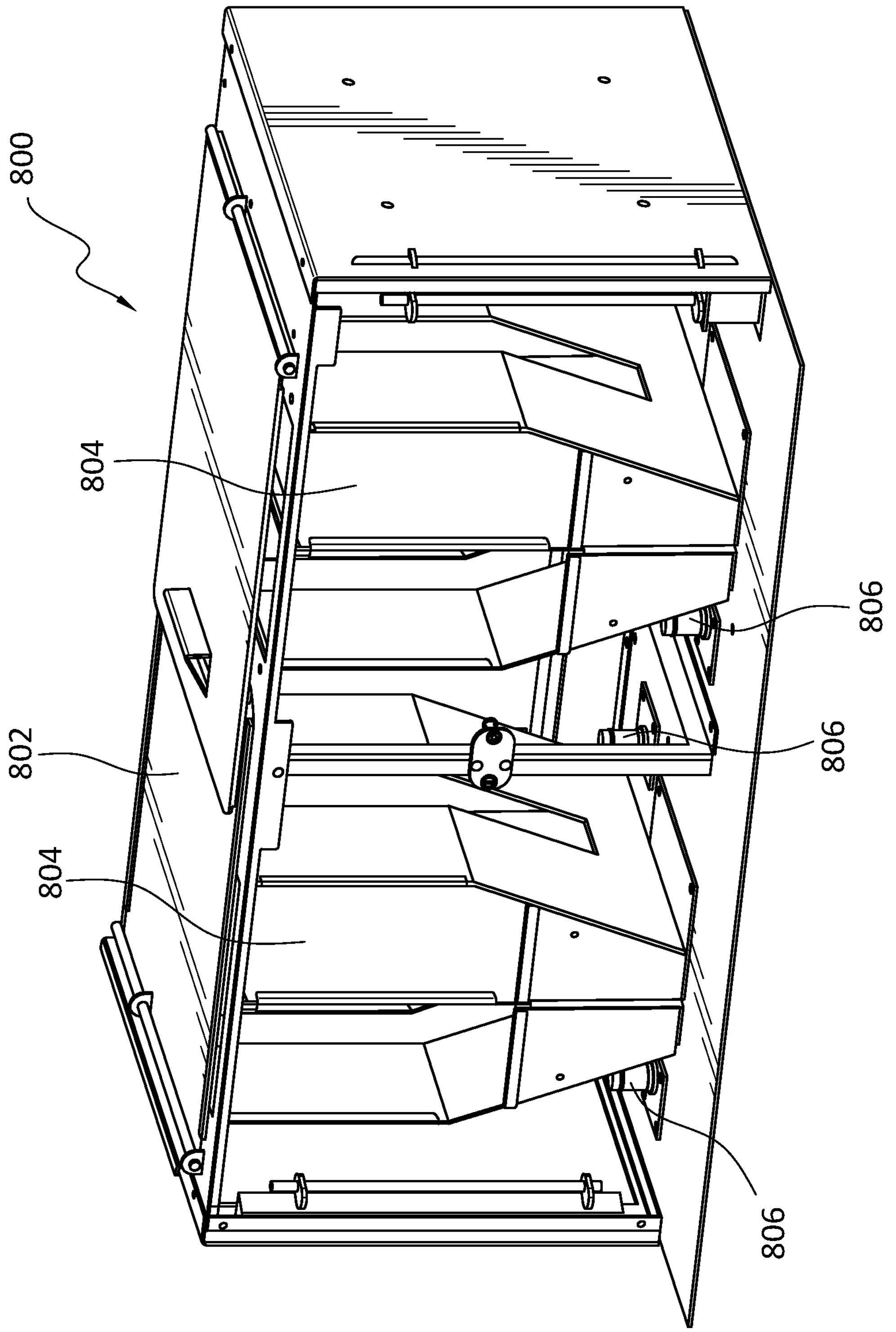
FIG. 10 is a schematic front, right side, top perspective view of a sixth embodiment of a new and improved touchless flowable product dispenser as constructed in accordance with the principles and teachings of the present invention.

With reference now being made to FIG. 10, a sixth embodiment of a new and improved touchless flowable product dispenser, as constructed in accordance with the principles and teachings of the present invention, is disclosed and is generally indicated by the reference character 800. It is to be noted that the sixth embodiment 800 of the present invention comprises structural components which are similar to structural components present within the previous embodiments 100,200,300,400,500 of the present invention, and therefore such similar structural components will be provided with reference numbers corresponding to the reference numbers noted in connection with the previous embodiments 100,200,300,400,500 of the present invention, however, they will be within the 800 series. It is further noted that the description of the sixth embodiment 800 of the present invention will be directed toward those structural components which are different from the structural components of the previous embodiments 100, 200,300,400,500 of the present invention. More particularly, it is noted that flowable products are not always packaged within canisters, but may be alternatively packaged within bags, pouches, or other containers. Accordingly, it is desirable to utilize the principles and teachings of the present invention in connection with containers that may not be canisters. Therefore, as seen within FIG. 10, the sixth embodiment 800 of the present invention comprises a housing 802 within which there is disposed a plurality of caddies 804. Within each caddy 804, there is disposed a bag or pouch, not shown, but which, for the purposes of this disclosure, is similar to the flowable product storage canister 628, for containing a flowable product. A suitable flowable product conduit or tube, not shown, is fluidically connected at one end thereof to an outlet port of each bag or pouch, not shown, while the opposite end of such flowable product conduit or tube is fluidically connected to a nipple 806. Another flowable product conduit or tube, also not shown, would fluidically connect each nipple 806 to a peristaltic pump, similar to the peristaltic pump 632 such that precise predetermined volumes of the flowable product can be dispensed. It is lastly to be understood that the entire touchless flowable product dispensing system is under the control of suitable electronic hardware and software.

Figure 11:
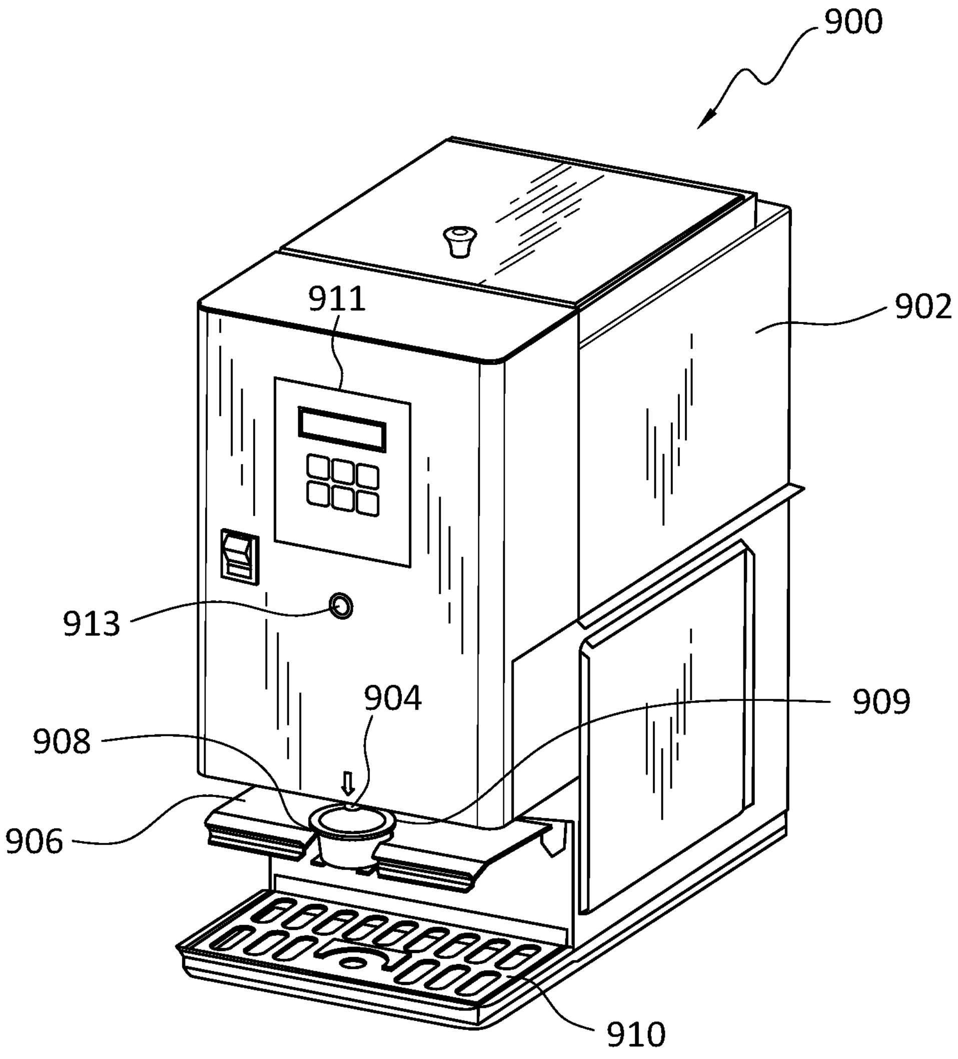
FIG. 11 is a schematic front, right side, top perspective view of a seventh embodiment of a new and improved touchless flowable product dispenser, as constructed in accordance with the principles and teachings of the present invention, wherein a pushbutton mechanism is utilized to cause the dispensing or discharge of the flowable product.

With reference lastly being made to FIG. 11, a seventh embodiment of a new and improved touchless flowable product dispenser, as constructed in accordance with the principles and teachings of the present invention, is disclosed and is generally indicated by the reference character 900. It is to be noted that the seventh embodiment 900 of the present invention comprises structural components which are similar to structural components present within the previous embodiments 100,200,300,400,500, 800 of the present invention, and therefore such similar structural components will be provided with reference numbers corresponding to the reference numbers noted in connection with the previous embodiments 100,200,300, 400,500,800 of the present invention, however, they will be within the 900 series. It is further noted that the description of the seventh embodiment 900 of the present invention will be directed toward those structural components which are different from the structural components of the previous embodiments 100, 200,300,400,500,800 of the present invention.

More particularly, it is seen that in accordance with the seventh embodiment 900 of the present invention, the dispenser or dispensing system 900 comprises a housing 902, a flowable product output dispensing spout, port, or nozzle 904, a horizontally oriented bracket 906 which is provided with a centrally located arcuately-configured cut-out section 908 which is adapted to accommodate a suitably sized cup or similar container 909 into which a precisely metered supply of the flowable product can be dispensed from the flowable product output dispensing spout, port, or nozzle 904, and a horizontally oriented support platform 910. A user interface is disclosed at 911, and a pushbutton activator is disclosed at 913. The pushbutton activator 913 is operatively connected to the peristaltic dispensing pump disposed internally within the housing 902, but not visible, whereupon depression of pushbutton activator 913 causes the peristaltic pump to be actuated. As has been previously noted, the peristaltic pump may be repetitively actuated byrepeatedly depressing the pushbutton activator 913 so as to sequentially discharge or dispense precisely predetermined amounts of food product, or still yet further, the pushbutton mechanism or activator 913 may be continuously activated by exerting a push or depression force upon the pushbutton mechanism or activator 913 such that the peristaltic pump will continuously dispense or discharge the food product until the push force, exerted upon the pushbutton mechanism, is removed.

Obviously, many variations and modifications of the present invention are possible in light of the above teachings. It is therefore to be understood that within the scope of the appended claims, the present invention may be practiced otherwise than as specifically described herein.

What is claimed as new and desired to be protected by Letters Patent, is:

1. A touchless flowable product dispensing system for dispensing flowable products in a hands-free, minimal contact manner, comprising:

a housing;

at least one first container disposed within said housing and within which a supply of at least one flowable product is stored;

at least one dispensing nozzle mounted upon said housing for dispensing the at least one flowable product stored within said at least one first container;

a flowable product dispensing mechanism for causing a predetermined amount of the flowable product to be dispensed from said at least one first container to said at least one dispensing nozzle when said flowable product dispensing mechanism is activated;

a horizontally oriented platform disposed upon said housing for supporting at least one second container into which at least one flowable product can be dispensed, wherein said horizontally oriented platform comprises a shelf which has at least one arcuate cut-out region operatively associated therewith for respectively confining a lower end portion of said at least one second container into which the at least one flowable product is to be dispensed; and a sensing system operatively connected to said flowable product dispensing mechanism such that when said at least one second container is disposed upon said horizontally oriented platform, a signal is transmitted to said flowable product dispensing mechanism so as to dispense a precise predetermined amount of the flowable product into said at least one second container in a hands-free, minimal contact manner.

2. The system as set forth in claim 1, wherein:

said at least one first container comprises at least one canister.

3. The system as set forth in claim 2, wherein:

said at least one canister comprises a plurality of canisters; and said at least one dispensing nozzle comprises a plurality of dispensing nozzles fluidically connected respectively to said plurality of canisters.

4. The system as set forth in claim 1, wherein:

said sensing system comprises a light beam sensing system for sensing the presence of said at least one second container disposed upon said horizontally oriented platform and for sending a signal to said flowable product dispensing system so as to activate said flowable product dispensing system.

5. The system as set forth in claim 2, wherein:

said flowable product dispensing system comprises a peristaltic pump.

6. The system as set forth in claim 5, wherein said peristaltic pump comprises:

a flexible, compressible tube through which the flowable product can flow from said at least one canister to said at least flowable product dispensing nozzle;

a rotor; and a plurality of rollers mounted upon said rotor such that as said rotor rotates, said plurality of rollers will occlude said flexible, compressible tube so as to trap a precise predetermined amount of flowable product between two consecutive ones of said plurality of rollers and then release said flexible, compressible tube so as to permit said peristaltic pump to dispense the precise predetermined amount of flowable product that was trapped between said two consecutive ones of said plurality of rollers.

7. The system as set forth in claim 1, wherein:

said sensing system comprises a hand-wave sensor for sensing a person's hand and for sending a signal to said flowable product dispensing system when a person's hand in waved in front of said hand-wave sensor so as to activate said flowable product dispensing system.

8. The system as set forth in claim 5, wherein:

said at least one canister is removably mounted upon said peristaltic pump.

9. The system as set forth in claim 8, wherein:

a flowable product flow control valve is mounted upon said at least one canister.

10. The system as set forth in claim 9, wherein:

said flowable product flow control valve is automatically moved to an OPEN position when said at least one canister is mounted upon said peristaltic pump so as to permit flowable product to be dispensed by said peristaltic pump when said peristaltic pump is activated, and automatically moved to a CLOSED position when said at least one canister is removed from said peristaltic pump so as to prevent leakage of the flowable product out from said at least one canister.

11. The system as set forth in claim 8, wherein:

said at least one canister is removably mounted upon said peristaltic pump by a bayonet connection.

12. The system as set forth in claim 5, wherein:

said peristaltic pump is reversible so as to suck back flowable product after a precise predetermined amount of flowable product has been dispensed whereby inadvertent dripping of the flowable product is prevented.

13. The system as set forth in claim 2, wherein:

an evacuation puck is disposed internally within said at least one canister and disposed atop the flowable product disposed within said at least one canister so as to prevent vortex and cavitation events from occurring within said at least one canister as flowable product is dispensed out from said at least one canister.

14. The system as set forth in claim 13, wherein:

said evacuation puck comprises a flat metal plate.

15. The system as set forth in claim 14, wherein:

said flat metal plate has a diametrical extent which is less than the internal diametrical extent of said at least one canister.

16. The system as set forth in claim 13, wherein:

said evacuation puck comprises a disk having a substantially U-shaped cross-sectional configuration.

17. The system as set forth in claim 13, wherein:

said evacuation puck has a diametrical extent less than, but substantially the same as, the internal diametrical extent of said at least one canister such that as flowable product is dispensed from said at least one canister, peripheral edge portions of said evacuation puck will scrape or wipe internal peripheral wall portions of said at least one canister so as to ensure that substantially all of the flowable product, originally disposed within said at least one canister, will be dispensed from said at least one canister.

18. The system as set forth in claim 1, wherein:

said at least one first container comprises at least one bag within which flowable product is stored.

19. The system as set forth in claim 18, wherein:

at least one caddy is mounted within said housing; and said at least one bag comprises at least two bags mounted within said at least one caddy.

20. A touchless flowable product dispensing system for dispensing flowable products in a hands-free, minimal contact manner, comprising:

a housing;

at least one first container disposed within said housing and within which a supply of at least one flowable product is stored;

at least one dispensing nozzle mounted upon said housing for dispensing the at least one flowable product stored within said at least one first container;

a reversible flowable product dispensing mechanism for causing a predetermined amount of the flowable product to be dispensed from said at least one first container to said at least one dispensing nozzle when said flowable product dispensing mechanism is activated in a first direction, and to suck back flowable product after a precise predetermined amount of flowable product has been dispensed so as to prevent inadvertent dripping of the flowable product when said flowable product dispensing mechanism is activated in a second opposite direction;

a horizontally oriented platform disposed upon said housing for supporting at least one second container into which at least one flowable product can be dispensed, wherein said horizontally oriented platform comprises a shelf which has at least one arcuate cut-out region operatively associated therewith for respectively confining a lower end portion of said at least one second container into which the at least one flowable product is to be dispensed; and a sensing system operatively connected to said flowable product dispensing mechanism such that when said at least one second container is disposed upon said horizontally oriented platform, a signal is transmitted to said flowable product dispensing mechanism so as to dispense a precise predetermined amount of the flowable product into said at least one second container in a hands-free, minimal contact manner.

21. The system as set forth in claim 20, wherein:

said reversible flowable product dispensing mechanism system comprises a peristaltic pump.

22. A touchless flowable product dispensing system for dispensing flowable products in a hands-free, minimal contact manner, comprising:

a housing;

at least one first container disposed within said housing and within which a supply of at least one flowable product is stored;

at least one dispensing nozzle mounted upon said housing for dispensing the at least one flowable product stored within said at least one first container;

a flowable product dispensing mechanism for causing a predetermined amount of the flowable product to be dispensed from said at least one first container to said at least one dispensing nozzle when said flowable product dispensing mechanism is activated;

a horizontally oriented platform disposed upon said housing for supporting at least one second container into which at least one flowable product can be dispensed, wherein said horizontally oriented platform comprises a shelf which has at least one arcuate cut-out region operatively associated therewith for respectively confining a lower end portion of said at least one second container into which the at least one flowable product is to be dispensed; and a pushbutton activator operatively connected to said flowable product dispensing mechanism such that when said at least one second container is disposed upon said horizontally oriented platform, and said pushbutton activator is depressed, a signal is transmitted to said flowable product dispensing mechanism so as to dispense a precise predetermined amount of the flowable product into said at least one second container in a hands-free, minimal contact manner.

* * * * *